United States Patent
Dobos et al.

(10) Patent No.: US 7,588,280 B2
(45) Date of Patent: Sep. 15, 2009

(54) ROLLER BLIND WITH SOFT SURFACE

(75) Inventors: Leonard Dobos, Kroning (DE); Christoph Jonischkeit, Grafing (DE); Wolfgang Strasser, Aham (DE); Josef Seisenberger, Neufraunhofen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 213 days.

(21) Appl. No.: 11/346,994

(22) Filed: Feb. 3, 2006

(65) Prior Publication Data

US 2006/0186696 A1    Aug. 24, 2006

(30) Foreign Application Priority Data

Feb. 10, 2005    (DE) .................. 10 2005 006 119

(51) Int. Cl.
    *B60R 7/06* (2006.01)
(52) U.S. Cl. ..................... 296/37.12; 220/350
(58) Field of Classification Search .......... 296/37.12; 220/350, 345.4; 224/483
    See application file for complete search history.

(56) References Cited

U.S. PATENT DOCUMENTS

| | | | |
|---|---|---|---|
| 2,064,470 A | 12/1936 | Heckman | |
| 2,573,962 A | 11/1951 | Fox et al. | |
| 3,717,247 A | 2/1973 | Moore | |
| 3,870,391 A * | 3/1975 | Nims ................. | 160/230 |
| 4,157,845 A | 6/1979 | Quéveau | |
| 4,923,244 A | 5/1990 | Clenet | |
| 4,934,750 A | 6/1990 | Eichler et al. | |
| 5,169,699 A | 12/1992 | Prince | |
| 5,752,740 A * | 5/1998 | Volkmann et al. ...... | 297/188.19 |
| 6,217,112 B1 | 4/2001 | Linsenmeier et al. | |
| 6,231,940 B1 | 5/2001 | Aichner et al. | |
| 6,398,890 B1 | 6/2002 | Spoerle | |
| 6,558,497 B2 | 5/2003 | Franco et al. | |
| 6,699,349 B1 | 3/2004 | Spoerle et al. | |
| 6,845,032 B2 | 1/2005 | Toyoda et al. | |
| 6,953,612 B2 | 10/2005 | Spoerle | |
| 7,087,842 B2 | 8/2006 | Belli et al. | |
| 7,343,956 B2 | 3/2008 | Schleef et al. | |
| 2002/0005424 A1 * | 1/2002 | Lange et al. ................ | 224/539 |
| 2002/0108698 A1 | 8/2002 | Spoerle | |

(Continued)

FOREIGN PATENT DOCUMENTS

DE    38 07 880 C2    1/1991

(Continued)

OTHER PUBLICATIONS

Search Report from European Application No. 06008980 dated Aug. 1, 2006.

(Continued)

*Primary Examiner*—Lori L Lyjak
(74) *Attorney, Agent, or Firm*—Wolf, Greenfield & Sacks, P.C.

(57) ABSTRACT

A roller blind for opening and closing a compartment, a storage box, a control console or other enclosures, in particular for use in a motor vehicle, is disclosed. The roller blind includes at least one support element and a padding layer. The roller blind may also include at least one intermediate layer and a decorative layer applied to the roller blind, where an intermediate layer includes padding.

22 Claims, 6 Drawing Sheets

U.S. PATENT DOCUMENTS

| | | |
|---|---|---|
| 2003/0052129 A1* | 3/2003 | Fukuo ............... 296/37.12 |
| 2004/0003890 A1 | 1/2004 | Bauer et al. |
| 2004/0029030 A1 | 2/2004 | Murray |
| 2004/0065456 A1 | 4/2004 | Belli et al. |
| 2004/0118851 A1 | 6/2004 | Shinomiya |
| 2005/0098257 A1 | 5/2005 | Bauer et al. |
| 2005/0194825 A1 | 9/2005 | Kurz et al. |
| 2005/0252317 A1 | 11/2005 | Ueki |
| 2005/0276874 A1 | 12/2005 | Menaldo et al. |
| 2006/0066118 A1* | 3/2006 | Radu et al. ............ 296/37.8 |
| 2007/0102463 A1* | 5/2007 | Thomas ............... 296/37.8 |

FOREIGN PATENT DOCUMENTS

| | | |
|---|---|---|
| DE | 40 10241 A1 | 4/1991 |
| DE | 42 20 670 A1 | 1/1994 |
| DE | 43 09 620 C2 | 1/1995 |
| DE | 195 24 177 C2 | 8/1996 |
| DE | 196 46 809 A1 | 5/1998 |
| DE | 196 54 246 A1 | 6/1998 |
| DE | 94 03 833 U1 | 3/1999 |
| DE | 19 822 425 C1 | 2/2000 |
| DE | 199 09 642 C1 | 4/2000 |
| DE | 19923512 A1 | 12/2000 |
| DE | 10023778 A1 | 11/2001 |
| DE | 20 2004 006 649 U1 | 10/2004 |
| EP | 1600330 A1 | 11/2005 |

OTHER PUBLICATIONS

Search Report from European Application No. 06018781 dated Feb. 16, 2007.

* cited by examiner

ROLLER BLIND WITH SOFT SURFACE

BACKGROUND

1. Field

Aspects of the invention relate to roller blinds for opening and closing compartments, storage boxes, control consoles and/or other similar enclosures, in particular enclosures in motor vehicles.

2. Discussion of Related Art

In upper mid-range or top-range motor vehicles, high requirements are placed on the appearance of the interior and in particular on the trim on compartments, control elements, storage compartments and the like, particularly in the region of the center console. As a result, roller blinds have been used in certain areas of motor vehicles to permit the movable opening and closing of these enclosures by hand.

Roller blinds of this kind generally comprise a plurality of support elements or slats connected to each other by means of an elastic connecting layer in such a way that the support elements engage in guides along which the roller blind moves. Typically, the displacement path of the roller blind is arranged so that the roller blind is forced out of a substantially horizontal alignment through a radius of curvature and into a substantially vertical alignment during opening of the roller blind.

For reasons of appearance, roller blinds typically include an outer decorative layer (i.e., a surface layer facing away from the opening to be closed) that is subsequently applied to the elastic layer connecting the slats. This layer is often formed, for example, of metal, wood, leather, cloth or film. The decorative layer is typically designed to meet certain requirements, such as aesthetics, resistance to mechanical and atmospheric influences and light, and ease of cleaning.

In this way, the known decorative layers fulfil most all aesthetic and functional requirements, but generally have a hard surface and are therefore not suitable, for example, for use as part of an armrest.

SUMMARY

In one illustrative embodiment, a roller blind for the movable opening and closing of an enclosure of a motor vehicle is provided. The roller blind includes at least one support element, at least one intermediate layer disposed adjacent the at least one support element, and a decorative layer disposed adjacent the at least one intermediate layer. At least one intermediate layer comprises padding.

In another illustrative embodiment, a roller blind for the movable opening and closing of an enclosure of a motor vehicle is provided. The roller blind includes at least one support element, and a padding layer supported by the at least one support element. The at least one support element and the padding layer are constructed and arranged to cooperate to allow rolling of the layers through a radius of curvature as the roller blind moves between an open position and a closed position.

Various embodiments of the present inventions provide certain advantages. Not all embodiments of the invention share the same advantages and those that do may not share them under all circumstances.

Further features and advantages of the present inventions, as well as the structure of various embodiments of the present inventions are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

According to one aspect, a covering for an enclosure, such as a compartment, a stowage box, a control console or other similar enclosure in a motor vehicle includes padding. The covering may be formed as a roller blind whereby the covering rolls through a radius of curvature between an enclosure closed position and an enclosure open position. In one embodiment, the covering is padded and is configured to support an arm, such as with an armrest, thereby increasing motor vehicle driver and/or passenger comfort. In this manner, the roller blind provides on the one hand suitable aesthetic requirements within the passenger compartment and on the other hand provides a particularly advantageous tactility (e.g., comfort) for the occupants of the vehicle.

In one embodiment, a roller blind is provided and includes at least one support element and a padding layer. In one embodiment, the roller blind also includes at least one intermediate layer, and a decorative layer applied to the roller blind. Here, the expression "to the roller blind" means the side of the roller blind facing away from the opening to be closed by the roller blind and hence means the surface of roller blind facing the passenger compartment. According to one embodiment, at least one of the intermediate layers applied below the decorative layer includes padding. It should be appreciated that the present invention is not limited in this respect, as decorative and/or intermediate layers need not be employed.

In one embodiment, the roller blind of the present invention is configured and can be installed in such a way that, even in the region of armrest compartments, its padded surface can also be provided in the same plane as the padded surfaces surrounding the roller blind region. Without padding, roller blinds were previously usually installed behind the plane of the padding in order, for example, not to offer a hard resting surface for the arm of an occupant of the vehicle, but to ensure that the arm lies exclusively on the surrounding padding. In one embodiment, construction and installation of a roller blind is simplified and the amount of stowage space within the enclosure may be increased by installing the roller blind in such a manner whereby its padded surface lies in substantially the same plane as the padded surfaces surrounding the roller blind region. It should be appreciated however, that the present invention is not limited in this respect, as the padded roller blind of the present invention need not be installed so as to lie in substantially the same plane as the surrounding surface.

In one embodiment, the padding comprises foam. In another embodiment, the padding comprises a textile. In one embodiment, the textile is between two outer layers and includes a fiber fabric with a preferred fiber direction substantially perpendicular to the outer layers. In still another embodiment, wadding is disposed in the region of the padding.

The padding layer may be formed in any suitable manner and employ any suitable materials that enables the padding layer to provide the desired comfort. Further, the amount of resistance from the indentation force exerted on the roller blind can vary with the depth of indentation. Also, this padding construct can offer resistance that the decorative layer exerts against displacement in a direction extending substantially parallel to the surface of the roller blind. In one embodiment, a gas volume content of the padding is set at at least 20%. In another embodiment the gas volume content of the padding is in a range of about 75% and about 96%.

As mentioned, the roller blind may be formed in a manner to render it comfortable for the user. In this regard, the roller blind may be used as an armrest, such as in a center console of a motor vehicle. In one illustrative embodiment, the padding comprises one or more gel-filled chambers. In another illustrative embodiment, the padding comprises one or more air-filled chambers. In yet another embodiment, a layered or localised combination of different types of padding may be employed. It should be appreciated, however, that the present invention is not limited in this regard, as other suitable padding constructs may be employed.

The padding may be located in the intermediate layer and/or in the decorative layer, as the present invention is not limited in this respect.

In one illustrative embodiment, the decorative layer with the padding has a Shore hardness of 5 SH L to 75 SH L. As is known, to measure the Shore hardness, a spherical profile is imposed on the surface to be measured. Thus, in the present invention, the profile is imposed on the combination of padding and decorative layer, and the indentation depth is measured.

In one embodiment, the decorative layer comprises a leather or leather-like material, for example Alcantara. In one embodiment, the decorative layer is designed in the style of a so-called crushed leather with which in relaxed condition, i.e. with a non-curved roller blind surface, in particular in the edge regions, a desired folding is visible and when the decorative layer is stretched, in particular when the roller blind is curved and hence the decorative layer is elongated, the decorative layer has a substantially smooth surface. In such an embodiment, the roller blind has a particularly high-quality appearance yet, even with repeated opening and closing of the roller blind, the decorative layer does not display any material fatigue. In this regard, as the roller blind moves through a radius of curvatures, elongation of the roller blind is provided by the folds and hence the actual material is not unduly stretched. Of course, other arrangements may be employed to allow the roller blind to articulate, as the present invention is not limited in this regard.

In one embodiment, the outward facing surface of the roller blind (i.e., the surface that faces away from the enclosure and toward the passenger compartment, when in use in a motor vehicle) is completely covered by the decorative layer. The decorative layer may also be cover of the side regions of the padding. In one embodiment, the decorative layer at least partially embraces the side regions of the padding and the support elements and is connected to the underside surface of the support element in a suitable manner. Other suitable arrangements for covering the outward facing surface of the roller blind may be employed, as the present invention is not limited in this regard.

The roller blind may be movably mounted to the enclosure in a manner to allow it to slide open or closed. In one embodiment, the support element has on its sides means, such as extensions, which are slidably mounted in two opposing sidewalls of a guide, such as a track, arranged on the enclosure. Such guides are widely used in vehicle manufacturing for stowage box designs that can be closed with roller blinds, and are often referred to as sliding-block guides. Hence, a roller blind is provided, in which the guidance of the roller blind is achieved with particularly simple means and exclusively by the support element and hence not by the intermediate layer or the decorative layer. Of course, other suitable arrangements for slidably mounting the roller blind may be employed, as the present invention is not limited in this respect.

In one embodiment, the support element comprises a plurality of spaced-apart segments (also referred to as support slats). These segments may be substantially the same design and may be substantially equally spaced along the length of the roller blind. This provides an embodiment of the roller blind which, in particular if these support slats are only connected to each other by the intermediate layer and the decorative layer, does not exert any function-impairing resistance to the curvature of the roller blind. It should be appreciated that other suitable arrangements for providing support to the roller blind without impeding movement may be employed, as the present invention is not limited to the use of support slats.

In one embodiment, the roller blind is arranged in the region of the center console of a motor vehicle and serves at least partially as a support for the lower arm of a motor vehicle occupant. Thus, the roller blind should be constructed in a manner to be stable enough to withstand the maximum expected forces without the failure of or damage to the roller blind. In one embodiment, the roller blind is designed to be able to withstand a compressive force of at least 800 N.

In one embodiment, the decorative layer has stitch seams aligned perpendicularly to the direction of displacement of the roller blind. This may enhance the ability of the roller blind to open and close. In this regard, the neutral fibers or axis in the region of the roller blind that curves when opening or closing extend through the connecting regions of the under and upper threads of the stitch seams.

The stitch seams may be located at any suitable region, as the present invention is not limited in this regard. In one embodiment, the stitch seams are formed between one or more or all support slats (when the support element comprises slats) and into the decorative layer and the padded layer. This may reduce the appearance of wear, for example, resulting from repeated opening and closing of the roller blind in the region between the slats.

The intermediate layer and decorative layer may be attached together in any suitable manner, as the present invention is not limited in this regard. In one embodiment, the layers are permanently attached to each other. In one embodiment, the intermediate layer and decorative layer are glued together. In another embodiment, the intermediate layer and decorative layer are welded together. In yet another embodiment, the intermediate layer and decorative layer are stitched together. Suitable combinations of gluing, welding and/or stitching (or other attachment arrangements) may be employed, as the present invention is not limited in this regard.

Figure 1:
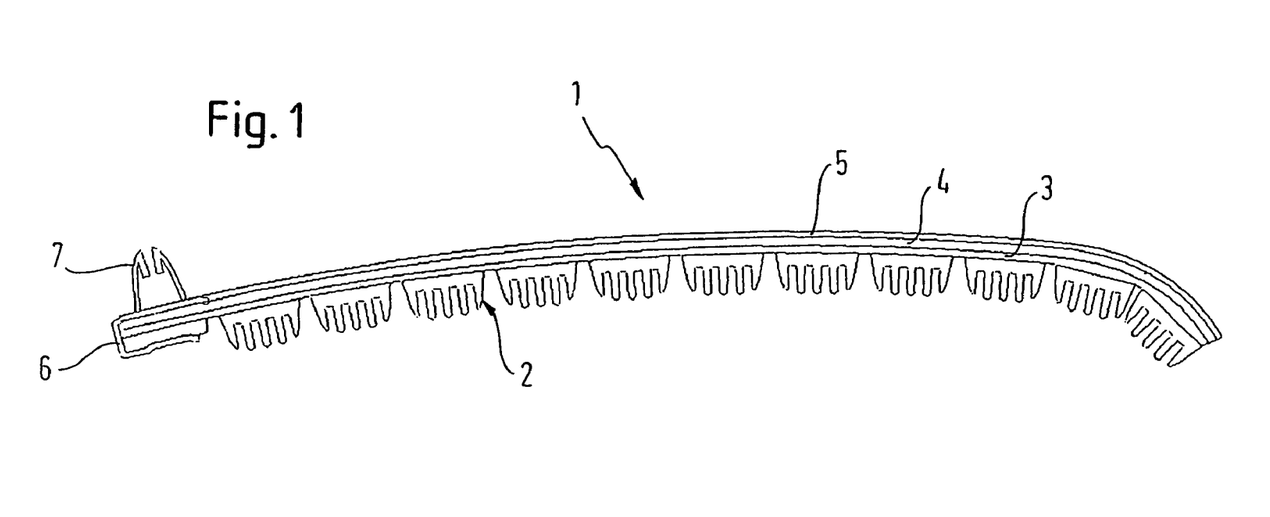
FIG. 1 a cross-sectional view of a first embodiment of the invention.
Figure 2:
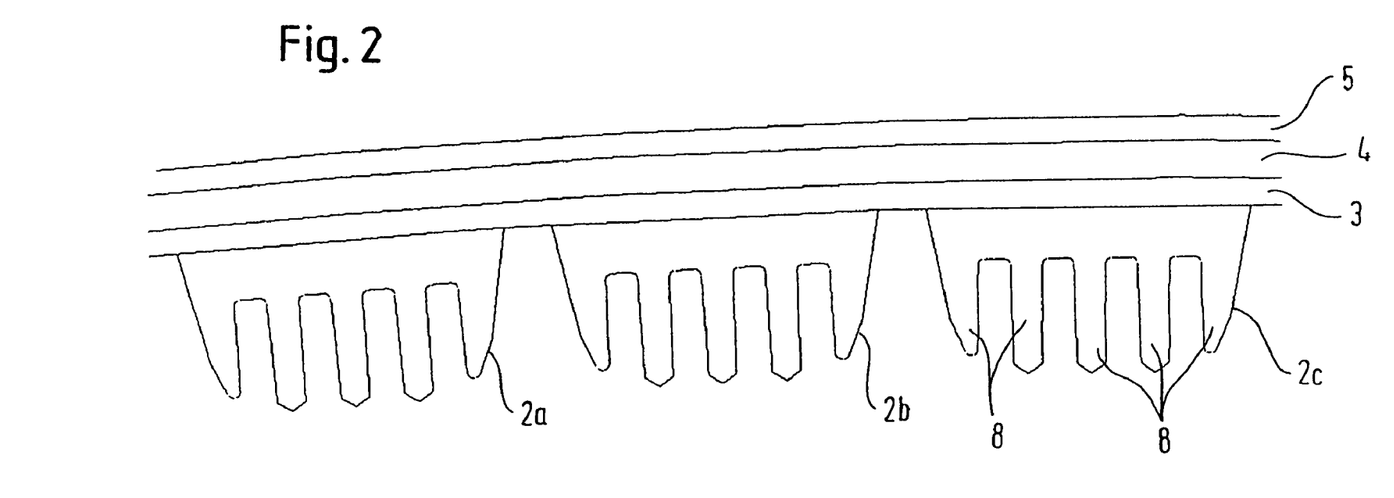
FIG. 2 is an enlarged view of a partial area of the embodiment shown in FIG. 1.

Turning now to the illustrative embodiments shown in the figures, FIGS. 1 and 2 show the cross section of a roller blind 1 according to one embodiment in which the support element 2 comprises a plurality of support slats 2a, 2b, 2c etc. In this embodiment, the individual support slats 2a, 2b, 2c comprise a plurality of bars 8 extending over substantially the entire length of the slats 2a, 2b, 2c and are connected to each other by an elastic layer 3 made of flexible plastic. Other suitable arrangements for connecting the slats may be employed, as the present invention is not limited in this regard.

In one embodiment, padded layer 4 is arranged above this elastic layer 3. In one embodiment, the padded layer is formed of foam, although as noted above, other suitable padding materials may be employed, as the present invention is not limited in this regard. In one embodiment, a decorative layer 5 is applied above the foam layer 4. It should be appreciated, however, that the present invention is not limited in this respect, as the decorative layer need not be employed or may be formed as the outer surface of the padded layer. The decorative layer need not be a separate component applied to the padded layer.

The roller blind according to one embodiment is restricted at its front end (on the left in FIG. 1) by an end element 6 embracing all the layers 2, 3, 4. In one embodiment, end element 6 includes a gripping element 7 at the upper end of the end element, which the occupant of the vehicle grasps to open and close the roller blind 1. Although the roller blind in this embodiment includes and end element with a gripping element, the present invention is not limited in this regard, as other suitable arrangements for facilitating movement may be employed.

Figure 3:
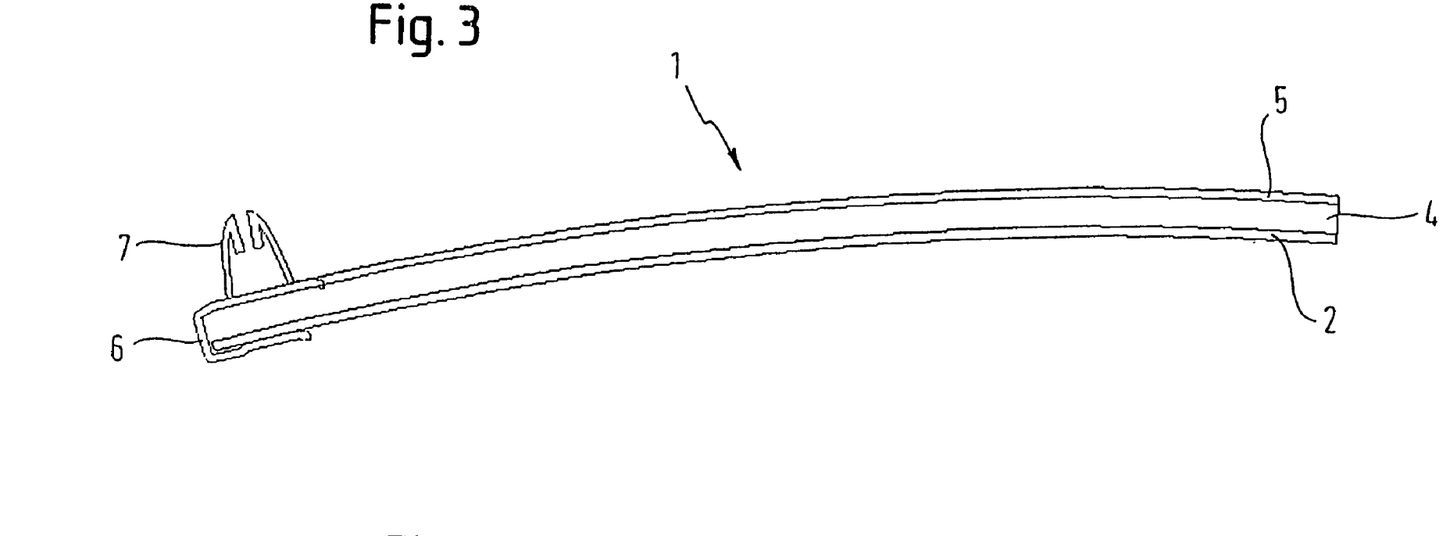
FIG. 3 is a second embodiment of the roller blind according to the invention.
Figure 4:
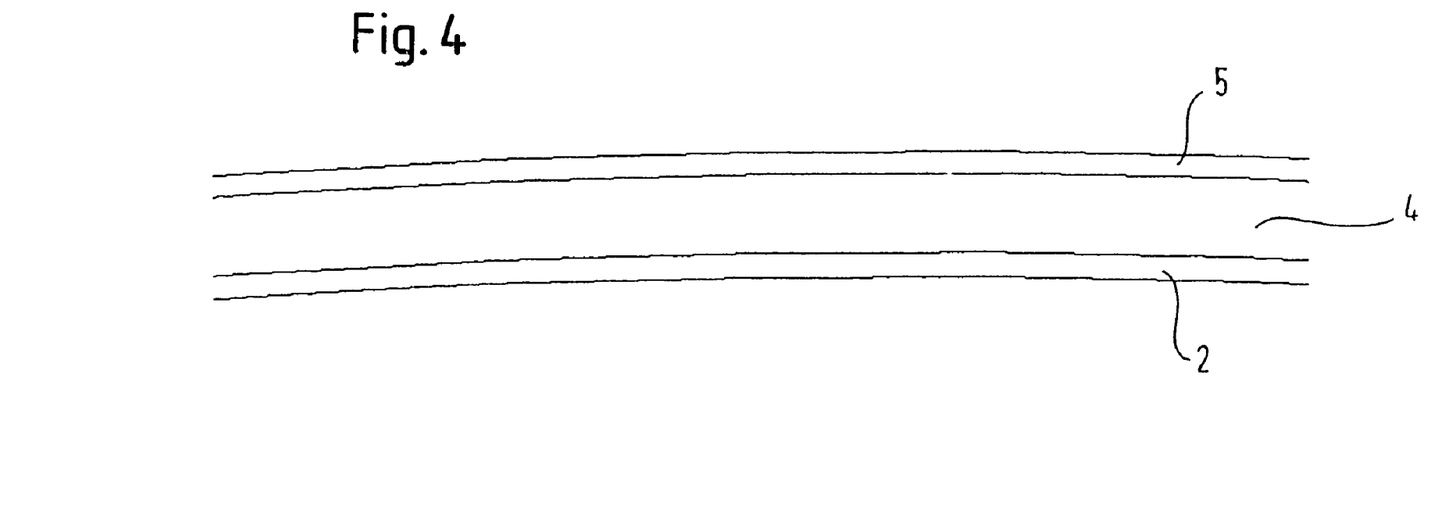
FIG. 4 is an enlarged view of a partial area in FIG. 3.

In the embodiment shown in FIGS. 3 and 4, the roller blind 1 has a continuous support element 2 made of an elastic and flexible sheet above which is arranged a padded layer 3 made of a spacer textile. In this embodiment, a decorative layer 4 formed of leather is disposed on the padded layer. Other suitable decorative layers may be employed, as the present invention is not limited in this regard. In one embodiment, the decorative layer is formed of imitation leather.

As with the embodiment described with respect to FIGS. 1 and 2, the roller blind 1 is restricted at its front end by an end element 6 with a gripping element 7. And, as with the embodiment described with respect to FIGS. 1 and 2, it should be appreciated other suitable arrangements for facilitating movement may be employed, as the present invention is not limited in this respect.

Figure 5:
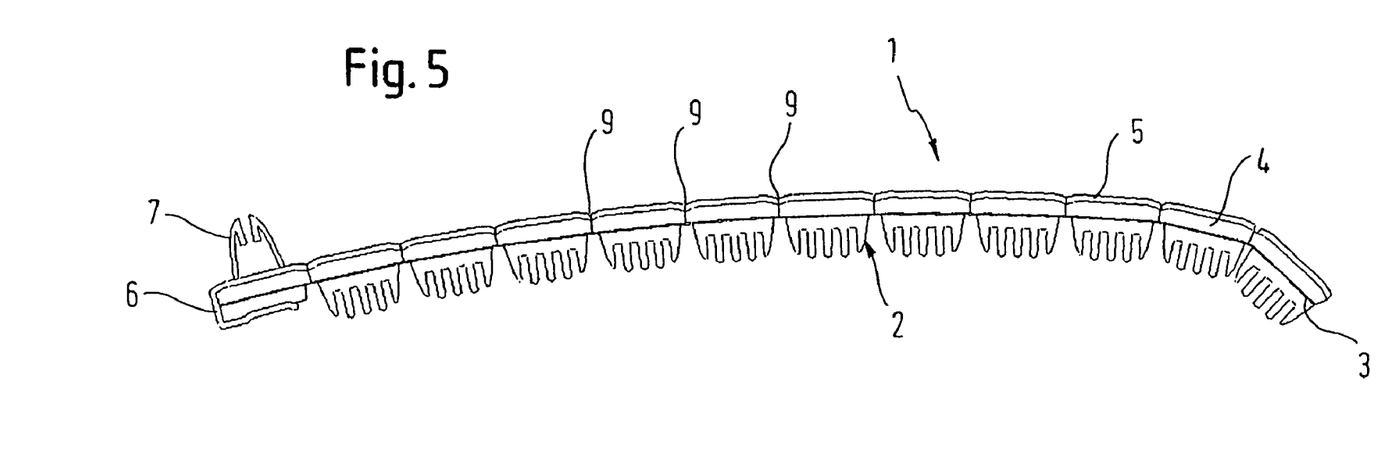
FIG. 5 is a cross-sectional view of a third embodiment of the invention.
Figure 6:
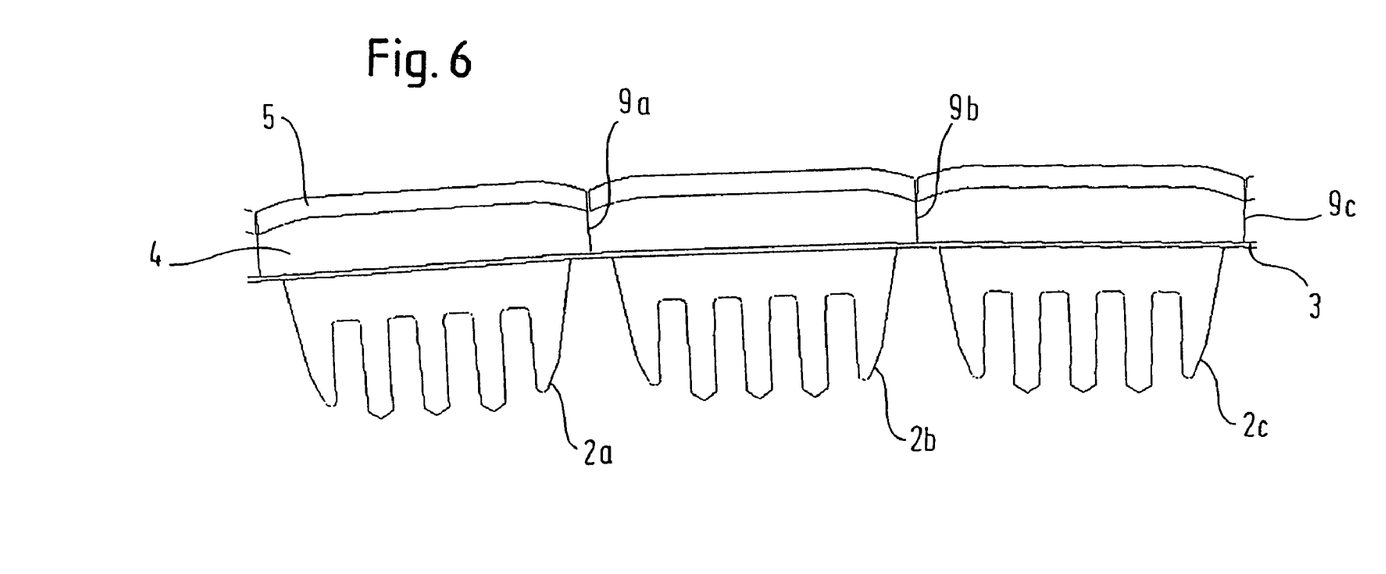
FIG. 6 is an enlarged view of embodiment shown in FIG. 5.

FIGS. 5 and 6 are cross-sectional views of a third embodiment of the roller blind 1 according to the invention. Like the first embodiment, the roller blind 1 of the embodiment shown in FIGS. 5 and 6 comprises a plurality of support elements 2a, 2b, 2c, which in this embodiment are connected to each other by a film element 3. Arranged above this film element is a padded layer made of wadding and a closing decorative layer 5 made of leather. Of course, other suitable padded and decorative layers may be employed, as the present invention is not limited in this respect.

In one embodiment, stitch seams 9a, 9b, 9c are introduced through the elastic layer 3, the padded layer 4 and the decorative layer 5, which, as clearly shown in FIG. 6, are each arranged between two adjacent support slats 2a, 2b, 2c. It is also evident that, with an embodiment of this kind, the curvature of the roller blind is substantially absorbed by the stitch regions and less by the regions lying between the stitch seams of the decorative layer.

It should be appreciated that other arrangements for joining the elastic layer, padded layer and decorative layer may be employed, as the present invention is not limited in this respect. For example, the layers may be adhesively bonded together. Alternatively, the layers may be welded together. Such joints may or may not be employed to localize the bending of the roller blind at the joint, as the present invention is not limited in this regard.

Figure 7:
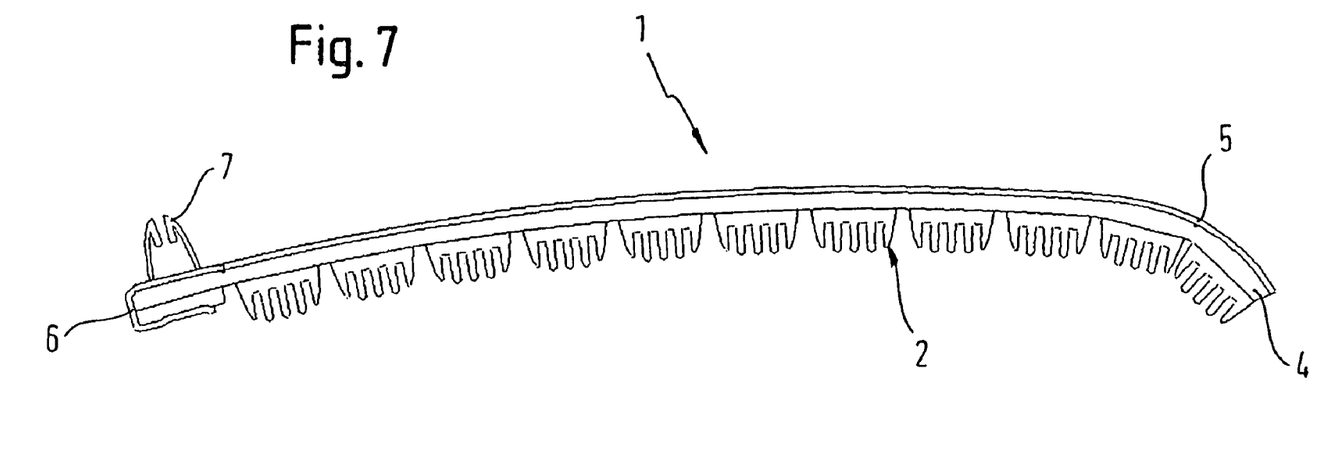
FIG. 7 is a cross-sectional view of a fourth embodiment of the invention.
Figure 8:
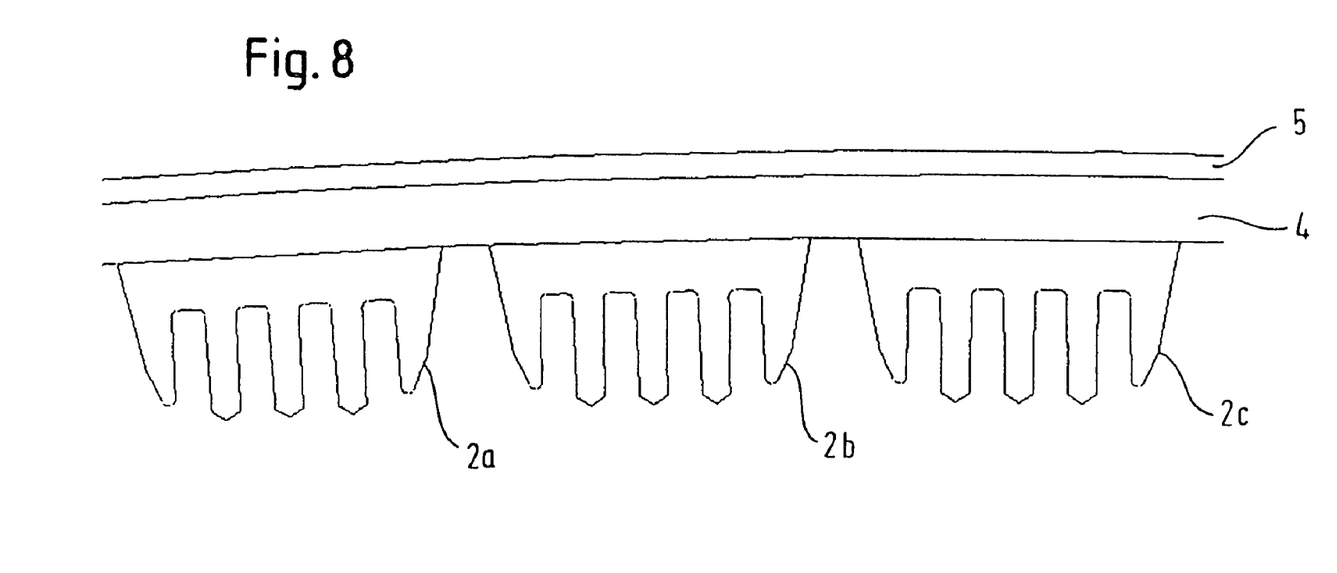
FIG. 8 is an enlarged partial view of the cross section of the fourth embodiment of the invention shown in FIG. 7.

FIGS. 7 and 8 are cross-sectional view of a fourth embodiment of the roller blind 1 according to the invention. In this embodiment, the support slats 2a, 2b, 2c are connected to each other by the under side of the intermediate layer 4. Further, in this embodiment, the intermediate layer comprises a textile; however, as noted, other suitable materials may be employed, as the present invention is not limited in this respect.

A continuous, non-stitched decorative layer 5 made of leather or imitation leather is disposed above the intermediate layer 4. Other suitable decorative layers may be employed, as the present invention is not limited in this respect.

Figure 9:
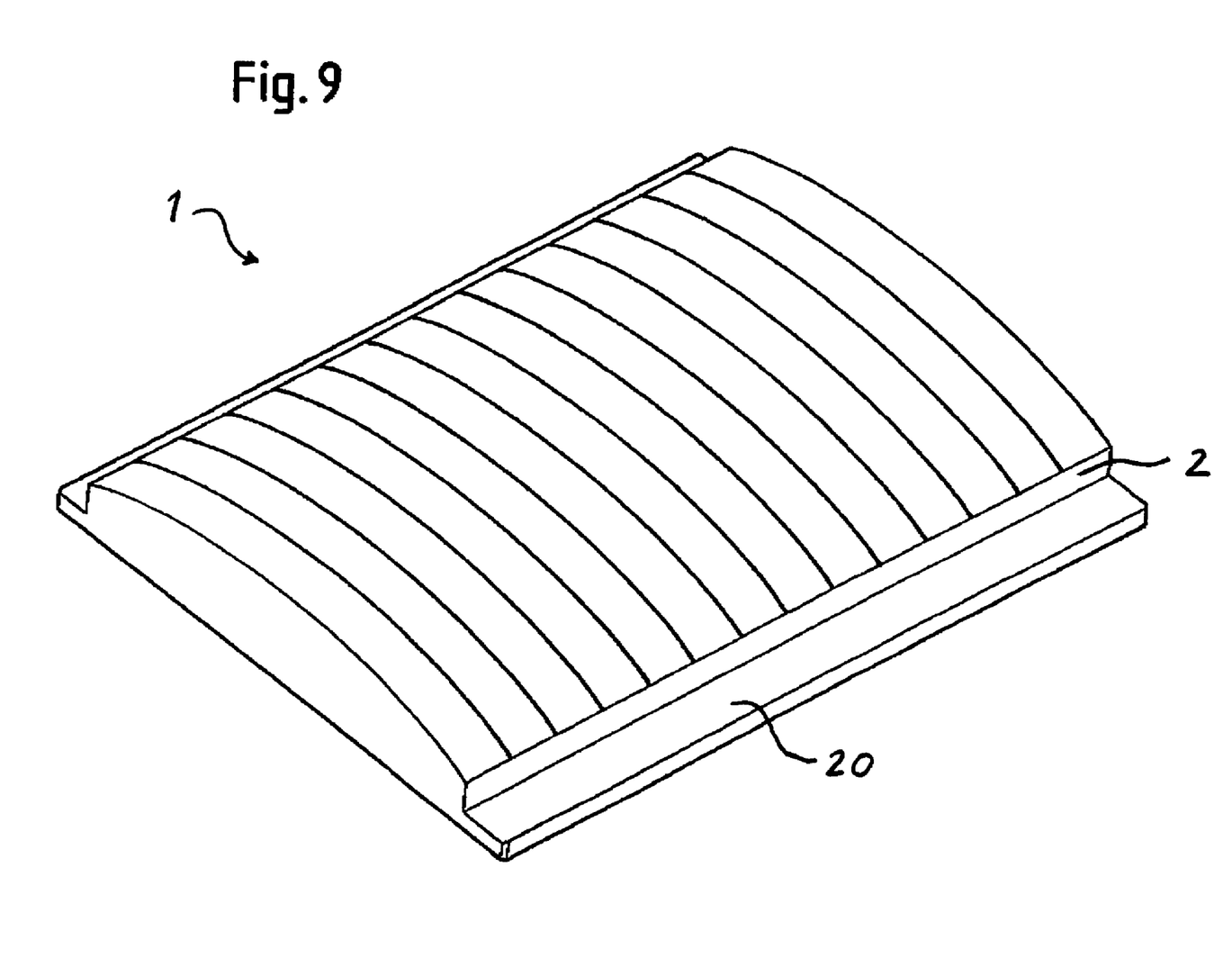
FIG. 9 is a perspective view of one embodiment of the roller blind.

As shown in FIG. 9, the roller blind is formed with extensions 20 that are adapted to cooperate with guide tracks (not shown) formed about the enclosure. In this manner, the roller blind can slidingly move along the track. The track itself may capture the extensions 20 so that the roller blind does not become inadvertently dislodged. The extensions may be formed in any suitable manner. In the embodiment shown in FIG. 9, the extensions 20 are formed as part of the support slats 2.

Figure 10:
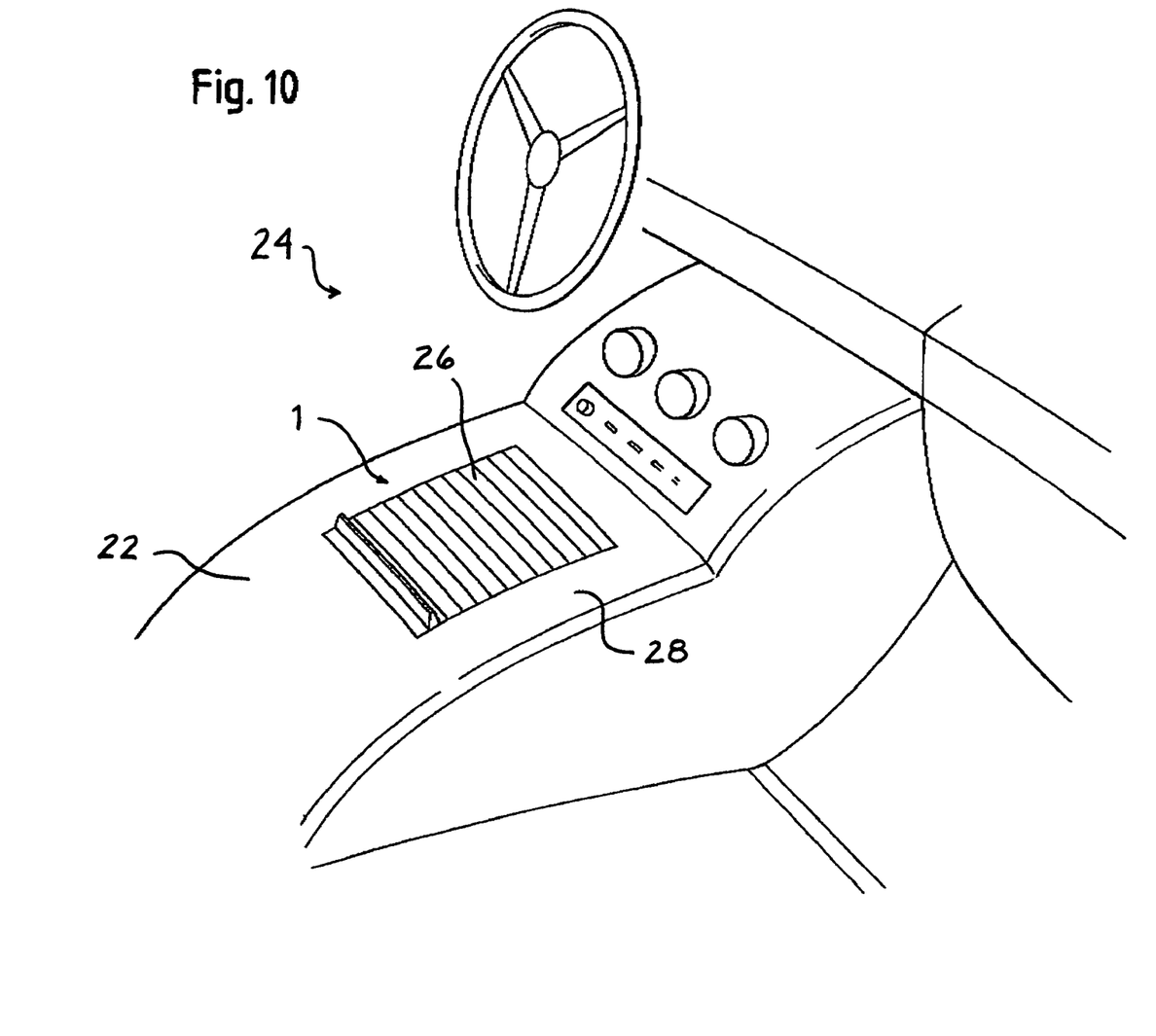
FIG. 10 is a perspective schematic representation of a motor vehicle passenger compartment with the roller blind disposed at the center console.

The roller blind may be installed on the motor vehicle such that its upper surface is substantially in the same plane as the surrounding area. In one embodiment, as shown in FIG. 10, the roller blind 1 is located in the center console 22 of the motor vehicle 24. As can be seen in FIG. 10, the roller blind 1 is also located so that its upper surface 26 is substantially in the same plane as the adjacent upper surface 28 of the center console 22.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A roller blind for movable opening and closing of an enclosure of a motor vehicle, the roller blind comprising:
   at least one support element, the at least one support element having a support surface;
   at least one intermediate layer disposed adjacent the at least one support element, the at least one intermediate layer covering substantially the entire support surface of the at least one support element; and
   a decorative layer disposed adjacent the at least one intermediate layer;
   wherein at least one intermediate layer comprises a padding.

2. The roller blind according to claim 1, wherein the padding comprises a foam.

3. The roller blind according to claim 1, wherein the padding comprises a textile.

4. The roller blind according to claim 1, wherein the padding comprises wadding.

5. The roller blind according to claim 1, wherein the padding has a gas volume content.

6. The roller blind according to claim 5, wherein the gas volume content in the padding comprises at least 20%, preferably 75-96%.

7. The roller blind according to claim 1, wherein the padding comprises one or more chambers.

8. The roller blind according to claim 7, wherein the chambers are filled with gel.

9. The roller blind according to claim 7, wherein the chambers are filled with air.

10. The roller blind according to claim 1, wherein the roller blind, when in use, defines an exterior-facing surface and an interior-facing surface, wherein the padding is disposed on a side of the roller blind defining the exterior-facing surface, and wherein the padding is configured to be substantially coextensive with the exterior-facing surface.

11. The roller blind according to claim 1, wherein the decorative layer with padding has a Shore hardness of 5 SH L to 75 SH L.

12. The roller blind according to claim 1, wherein the decorative layer comprises a leather or leather-like material.

13. The roller blind according to claim 12, wherein the decorative layer comprises a crushed leather, which in a relaxed state of the roller blind has folds and in the curved state of the roller blind has a substantially smooth surface.

14. The roller blind according to claim 1, wherein the at least one support element comprises means slidably mountable in two opposing sidewalls of the enclosure.

15. The roller blind according to claim 1, in combination with the motor vehicle, wherein the roller blind is arranged in the region of a central armrest of the motor vehicle and the surface of the decorative layer of the roller blind is arranged in a plane that is substantially in a plane with decorative layers of the motor vehicle surrounding the roller blind.

16. The roller blind according to claim 1, wherein the at least one support element comprises a plurality of substantially identical and similarly spaced support slats.

17. The roller blind according to claim 1, in combination with the motor vehicle, wherein the roller blind is arranged in the region of a central console of the motor vehicle, wherein the roller blind is constructed and arranged to absorb a compressive force of at least 800 Newton.

18. The roller blind according to claim 1, wherein the decorative layer and the intermediate layer comprise stitch seams aligned perpendicular to a displacement direction of the roller blind.

19. The roller blind according to claim 18, wherein the decorative layer and the intermediate layer are stitched between at least some support slats.

20. The roller blind according to claim 1, wherein the intermediate layer is at least one of glued, welded, and stitched to the decorative layer.

21. The roller blind according to claim 5, wherein the gas volume content in the padding comprises 75%-96%.

22. A roller blind for movable opening and closing of an enclosure of a motor vehicle, the roller blind comprising:
   at least one support element, the at least one support element having a support surface;
   a padding layer supported by the at least one support element, the padding layer covering substantially the entire support surface of the at least one support element;
   a decorative layer disposed adjacent the padding layer; and
   wherein the at least one support element and the padding layer are constructed and arranged to cooperate to allow rolling of the layers through a radius of curvature as the roller blind moves between an open position and a closed position.

* * * * *

UNITED STATES PATENT AND TRADEMARK OFFICE
CERTIFICATE OF CORRECTION

PATENT NO. : 7,588,280 B2  Page 1 of 1
APPLICATION NO. : 11/346994
DATED : September 15, 2009
INVENTOR(S) : Dobos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this

Twenty-first Day of September, 2010

David J. Kappos
*Director of the United States Patent and Trademark Office*